(12) United States Patent
Wahrburg et al.

(10) Patent No.: US 10,969,755 B2
(45) Date of Patent: *Apr. 6, 2021

(54) SEMI-AUTOMATIC, INTERACTIVE TOOL TO IDENTIFY PHYSICAL PARAMETERS OF A MECHANICAL LOAD

(71) Applicant: ABB SCHWEIZ AG, Baden (CH)

(72) Inventors: Arne Wahrburg, Darmstadt (DE); Edo Jelavic, Zurich (CH)

(73) Assignee: ABB SCHWEIZ AG, Baden (CH)

( * ) Notice: Subject to any disclaimer, the term of this patent is extended or adjusted under 35 U.S.C. 154(b) by 68 days.

This patent is subject to a terminal disclaimer.

(21) Appl. No.: 16/214,161

(22) Filed: Dec. 10, 2018

(65) Prior Publication Data

US 2019/0163148 A1 May 30, 2019

Related U.S. Application Data

(63) Continuation of application No. PCT/EP2017/063986, filed on Jun. 8, 2017.

(30) Foreign Application Priority Data

Jun. 10, 2016 (EP) .................................. 16001318

(51) Int. Cl.
*G05B 17/02* (2006.01)

(52) U.S. Cl.
CPC .................................. *G05B 17/02* (2013.01)

(58) Field of Classification Search
CPC ..................................................... G05B 17/02

USPC ........................................................... 700/30
See application file for complete search history.

(56) References Cited

U.S. PATENT DOCUMENTS

| 5,172,312 | A | * | 12/1992 | Iino | ........................ | G05B 17/02 |
| | | | | | | 700/29 |
| 2007/0220454 | A1 | * | 9/2007 | Rassaian | ................. | G06F 30/23 |
| | | | | | | 703/1 |
| 2013/0166077 | A1 | * | 6/2013 | Elliott | .................... | F16F 15/002 |
| | | | | | | 700/280 |
| 2013/0344830 | A1 | * | 12/2013 | Coe | ..................... | H04W 52/367 |
| | | | | | | 455/127.1 |

FOREIGN PATENT DOCUMENTS

WO WO 2017211966 A1 12/2017

OTHER PUBLICATIONS

Villwock S et al: "Influence of the power density spectrum of the excitation signal on the identification of drives", Industrial Electronics, 2008. IECON 2008. 34$^{th}$ Annual Conference of IEEE, Nov. 10, 2008 (Nov. 10, 2008), pp. 1252-1257, XP031825599.

(Continued)

*Primary Examiner* — Robert A Cassity
(74) *Attorney, Agent, or Firm* — Leydig, Voit & Mayer, Ltd.

(57) ABSTRACT

A method to identify physical parameters of a mechanical load includes the following steps: applying a first control signal to a mechanical device in a control circuit; measuring a first return signal; and using a power density spectrum of the first return signal to stipulate an excitation signal for the mechanical device.

9 Claims, 14 Drawing Sheets

(56) References Cited

OTHER PUBLICATIONS

Rolf Isermann, Marco Münchhof: "Identification of Dynamic Systems", 2011, Springer-Verlag, XP002772807, pp. 21-23, 54, 161-175.
Rik Pintelton, Johan Schoukens: "System Identification: A Frequency Domain Approach", 2012, John Wiley & Sons, Inc., XP002772823, pp. 54-64.

* cited by examiner

US 10,969,755 B2

SEMI-AUTOMATIC, INTERACTIVE TOOL TO IDENTIFY PHYSICAL PARAMETERS OF A MECHANICAL LOAD

CROSS-REFERENCE TO PRIOR APPLICATION

This application is a continuation of International Patent Application No. PCT/EP2017/063986, filed on Jun. 8, 2017, which claims priority to European Patent Application No. EP 16001318.1, filed on Jun. 10, 2016. The entire disclosure of both applications is hereby incorporated by reference herein.

FIELD

The present invention relates to tool and a method to identify physical parameters of a mechanical load.

BACKGROUND

In order to achieve high performance in speed- or position-controlled applications, the feedback and feedforward components in the control loop have to be carefully tuned, as well as additional filters. Most tuning methods resulting in such a set of parameters rely on a parametric model of the mechanical load to be available. An example are two-mass systems with compliant coupling as depicted in FIG. 1c.

Such systems are described by a set of physical parameters, such as torsional stiffness and damping, inertia ratio, etc. In many applications, these parameters are not known but have to be identified from measurements of motor torque (the system input) and motor speed (the system output). This invention disclosure proposes a new approach to obtain estimates of the relevant mechanical parameters.

SUMMARY

In an embodiment, the present invention provides a method to identify physical parameters of a mechanical load, comprising: applying a first control signal to a mechanical device in a control circuit; measuring a first return signal; and using a power density spectrum of the first return signal to stipulate an excitation signal for the mechanical device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

The problem underlying the invention is to determine the physical parameters of a mechanical load coupled to a motor, whereby a user is able to identify and mark characteristic points in calculated curve courses, said characteristic points being determined in a semiautomatic process.

Purpose: A widely used approach is to perform identification measurements and evaluate them by calculation of the frequency response of the mechanical load attached to the Drive/Motor unit. Evaluating identification measurements using e.g. Fast Fourier-Transforms (FFTs) results in a non-parametric frequency response estimates. For each frequency, an estimate of magnitude and phase of the system transfer function is obtained.

However, in order to design controllers for the system at hand, a parametric estimate is required for most tuning methods. A parametric model for the mechanics sketched in FIG. 1c is given by the mechanical transfer function $$G_{TMS}(s) = \frac{s^2 J_L + s(d_T + d_L) + k_T}{s^3 J_M J_L + s^2 (J_L d_M + d_T (J_M + J_L) + J_M d_L) + s(d_{tot} d_T + k_T (J_M + J_L) + d_M d_L) + k_T d_{tot}}.$$

To completely describe the model and its characteristics, the corresponding mechanical parameters (motor inertia $J_M$, load inertia $J_L$, motor-side damping $d_M$, load-side damping $d_L$, torsional stiffness $k_T$, torsional damping $d_T$) have to be found. In other words, the physical parameters of the mechanical load (e.g. stiffness and damping coefficients) have to be identified from the non-parametric estimate.

Figure 2:
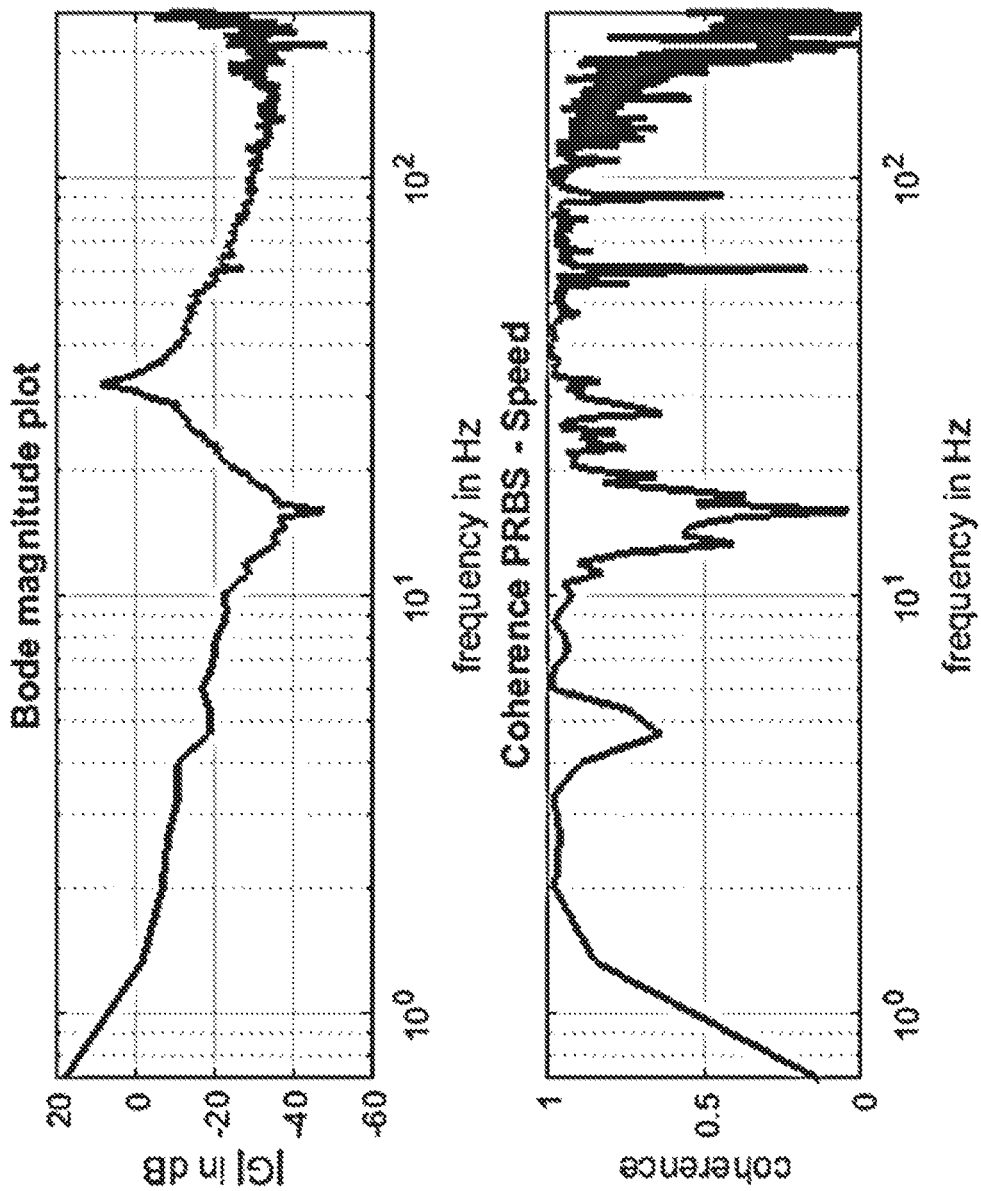
FIG. 2 shows non-parametric frequency response estimate and corresponding coherence estimate.
Figure 2C:
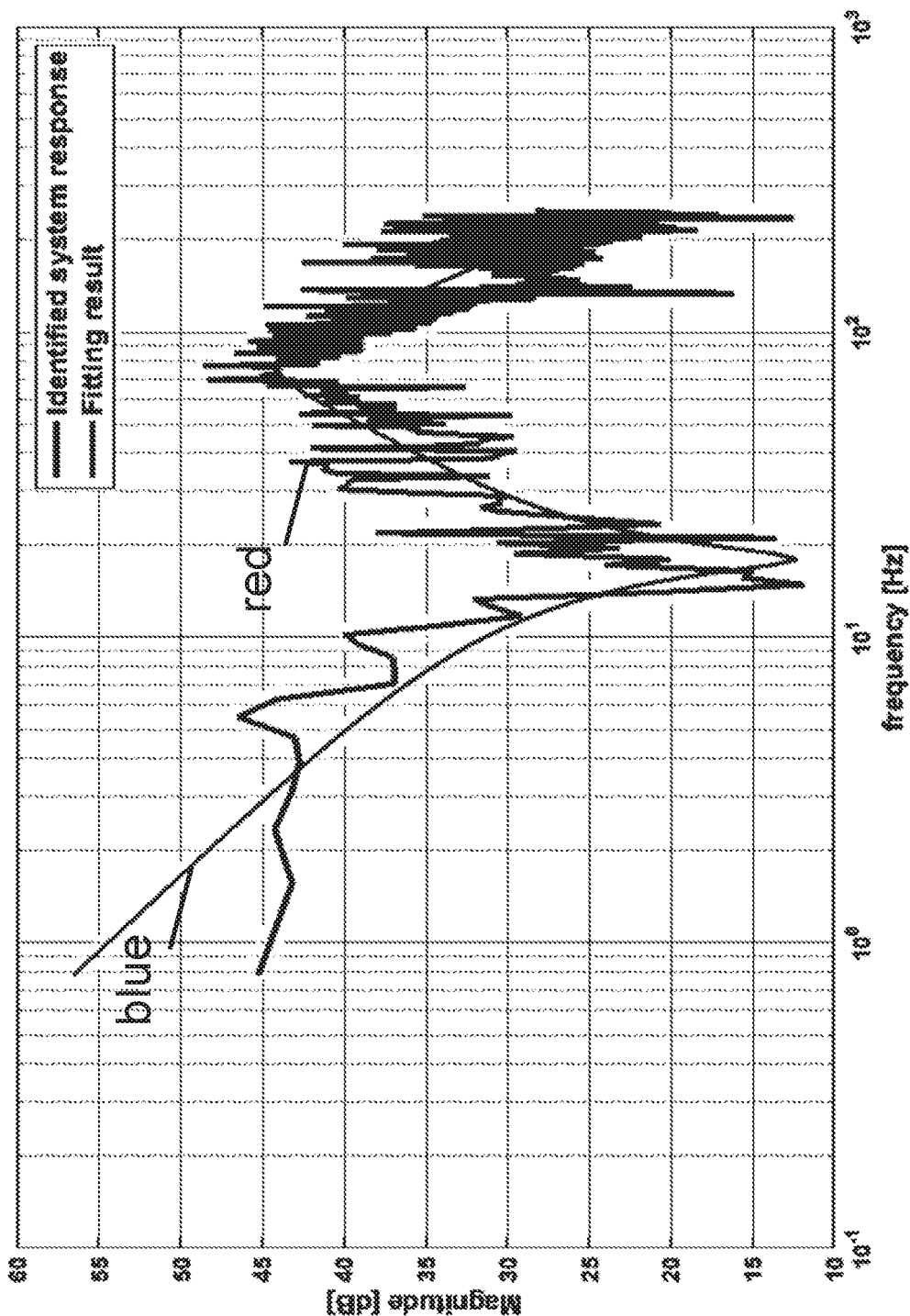
FIG. 2c shows non-parametric frequency response estimate (red curve) and fitted parametric model (blue curve, fitted curve), FIG. 3c, 3ca show features defining a two-mass system.

FIG. 2c shows an example of a non-parametric estimate in red and a corresponding parametric estimate in blue (fitted curve).

The blue curve is obtained by performing a curve fit onto the red curve, where the structure of the mechanical plant is assumed to be known (cf. the transfer function $G_{TMS}(s)$ above).

From a practical perspective, this assumption is valid since a wide class of mechanical system can reasonably well be approximated by two-mass systems.

While mature methods are available to solve this problem automatically (s. related ID "A robust automatic method to identify physical parameters of a mechanical load with integrated reliability indication", filed as European patent application 16001317.3), there are difficult cases in which those automatic methods fail or only allow obtaining a valid model in a limited frequency range, which in turn limits the achievable control performance.

The key novelty is the development of a method that allows the user to identify the physical parameters of a mechanical system in an interactive and easy-to-use manner. No special control engineering knowledge is required.

Based on a non-parametric estimate (i.e. a frequency response), the user is guided through the identification by simple instructions. In this interactive procedure, the user only has to identify simple characteristics of a curve (e.g. a peak).

Another novelty is that the proposed method allows to interactively refine each step of the identification procedure.

Benefits: Since chances of integration into future software products as an advertised feature are realistic, the benefit arises from adding a new, interactive feature to existing Drives software.

The advantages are

Mechanical load identification can be conducted by non-experts

Potential benefits arising from a unique, interactive feature in Drives software Reduced commissioning time Increased control performance based on improved model identification.

A pseudo-random binary signal could be used as excitation signal.

Advantageously, only two values are thus used for the excitation signal. The amplitude of the excitation signal is thus limited.

A second control signal comprising the first control signal and the excitation signal could be applied to the control circuit and the power density spectra of the second control signal and the second return signal are calculated, wherein the frequency response of the mechanical device is calculated from the power density spectra.

The frequency response of the mechanical device can thus be estimated when no parameters of the mechanical device are yet reliably known.

A reference model could be selected by a user for the mechanical device.

A user can thus select a suitable model which comes as close as possible to the actual mechanical device. The user is not limited to a single reference model, which is possibly not suitable for describing the physical behaviour of the mechanical device in terms of a model.

The selection could be made by reference to a graphical representation of the frequency response of a respective reference model, wherein the respective reference model can be described by physical parameters.

The human ability to recognise model structures or patterns intuitively can thus be used. By reference to a graph, the user can decide on a reference model which provides a good simulation of the actual mechanical device. Rigidity behaviour, resonance behaviour or coupling behaviour of the actual mechanical device can be recognised on the basis of patterns typical thereof. The user is then able to select a reference model until such time as the actual mechanical device is depicted as well as possible.

Characteristic positions in the frequency response of the selected reference model could be determined or marked by the user in the calculated frequency response.

Images or graphs can thus be suggested to the user, which he can select and process to find a suitable reference model.

The physical parameters of the reference model are calculated and output from the characteristic positions.

The physical parameters can thus be determined by the user. The reference model is described by the physical parameters.

By reference to the output physical parameters the frequency response of the reference model is graphically superimposed with the calculated frequency response.

Fine tuning of the physical parameters is thus possible.

Figure 1:
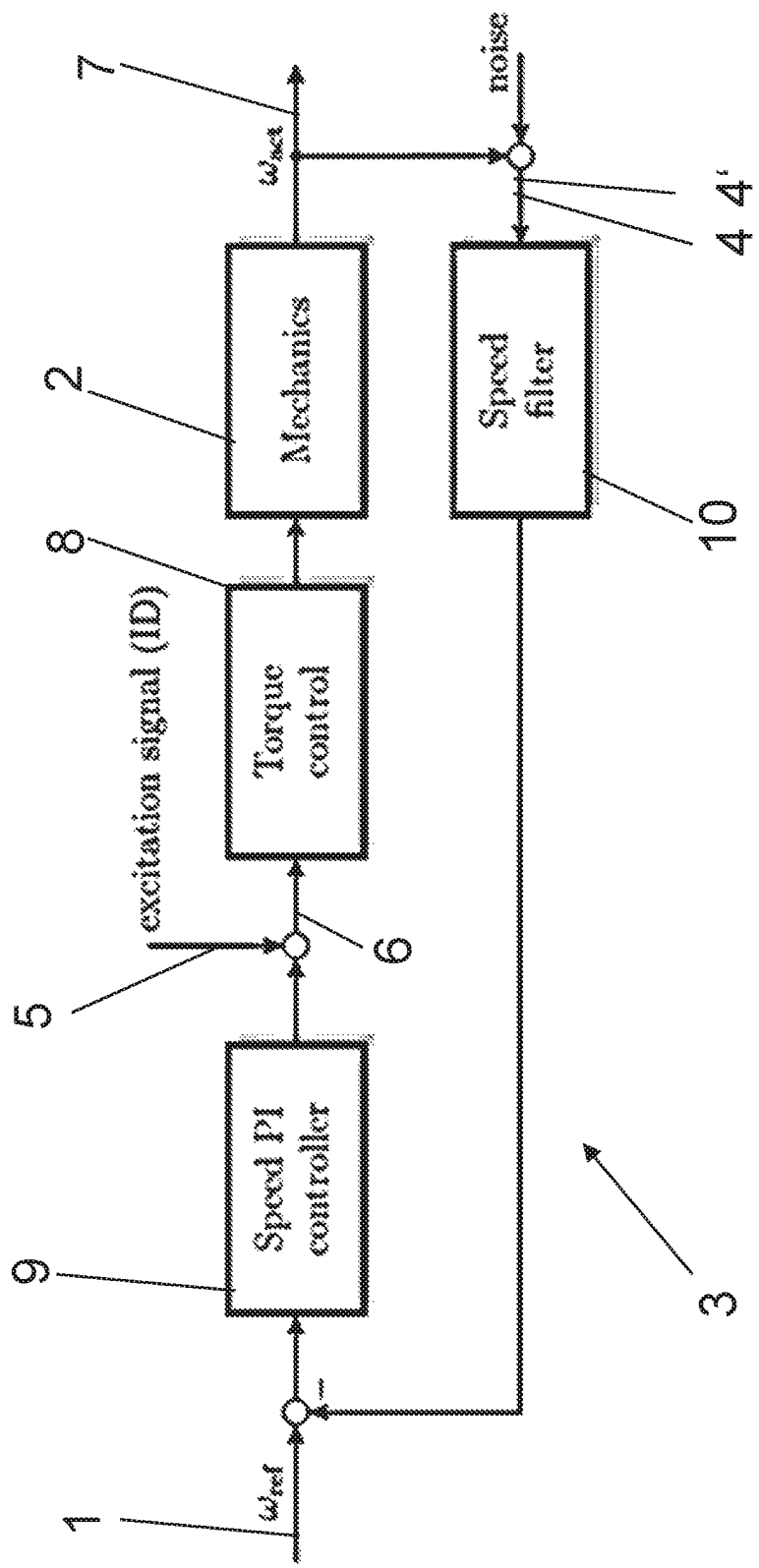
FIG. 1 shows speed control loop of variable speed drives.
Figure 1C:
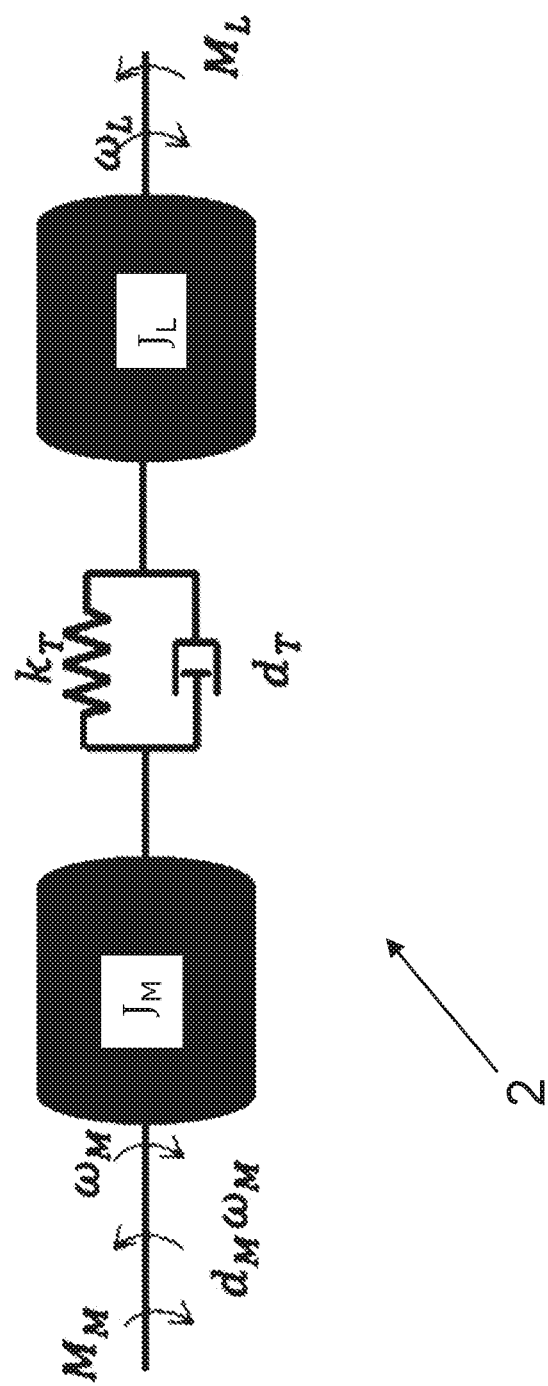
FIG. 1c shows a mechanical two-mass system.

FIG. 1 shows the following method in a diagrammatic view:

Method in which a first control signal 1 is applied to a mechanical device 2 in a control circuit 3, wherein a first return signal 4 is measured.

The power density spectrum of the first return signal 4 is used to stipulate an excitation signal 5, preferably a broadband excitation signal, for the mechanical device 2. A pseudo-random binary signal is used as excitation signal 5.

A second control signal 6 comprising the first control signal 1 and the excitation signal 5 is applied to the control circuit 3 and the power density spectra of the second control signal 6 and the second return signal 4' are calculated, wherein the frequency response of the mechanical device 2 is calculated from the power density spectra.

The physical parameters of a reference model of a mechanical device 2 can be determined by the invention described here.

Control circuit 3 shown diagrammatically in FIG. 1 comprises a speed controller 9, a subordinate torque control 8 and a speed filter 10.

Speed controller 9 sends first control signal 1 directly to torque control 8. Torque control 8 then controls mechanical device 2. Mechanical device 2 generates an actual angular velocity 7 ($\omega_{act}$).

Mechanical device 2 is preferably constituted as a motor with a shaft to which a load is coupled.

A measured value, i.e. first feedback signal 4, corresponds to actual angular velocity 7. A check is made to see how great the noise component is in first feedback signal 4. Excitation signal 5 is calculated on the basis of the magnitude of the noise component.

Since both second control signal 6 and second feedback signal 4' are known, the physical parameters of the reference model of mechanical device 2 can be determined.

The following is stated in reference to FIG. 1c:

MM denotes the torque which forces the torque control 8. Angular velocity $\omega_{act}$ corresponds to $\omega_M$. Magnitude $d_M \omega_M$ represents a damping. $J_M$ stands for the inertia of the motor. Magnitude $k_T$ stands for the rigidity of the shaft, $d_T$ stands for the damping of the shaft. $J_L$ stands for the inertia of the load. The speed of the load is expressed in $\omega_L$. $M_L$ corresponds to a load moment. Parameters $k_T$, $d_T$, $J_L$, $J_M$, $d_M$ and $d_L$ (damping of the load) can be derived from the red curve in FIG. 3 and the blue curve in FIG. 2c and establish the course of the mentioned curves.

A reference model is selected by a user for the mechanical device 2. The selection is made by reference to a graphical representation of the frequency response of a respective reference model, wherein the respective reference model can be described by physical parameters.

Characteristic positions in the frequency response of the selected reference model are determined or marked by the user in the calculated frequency response.

Figure 3:
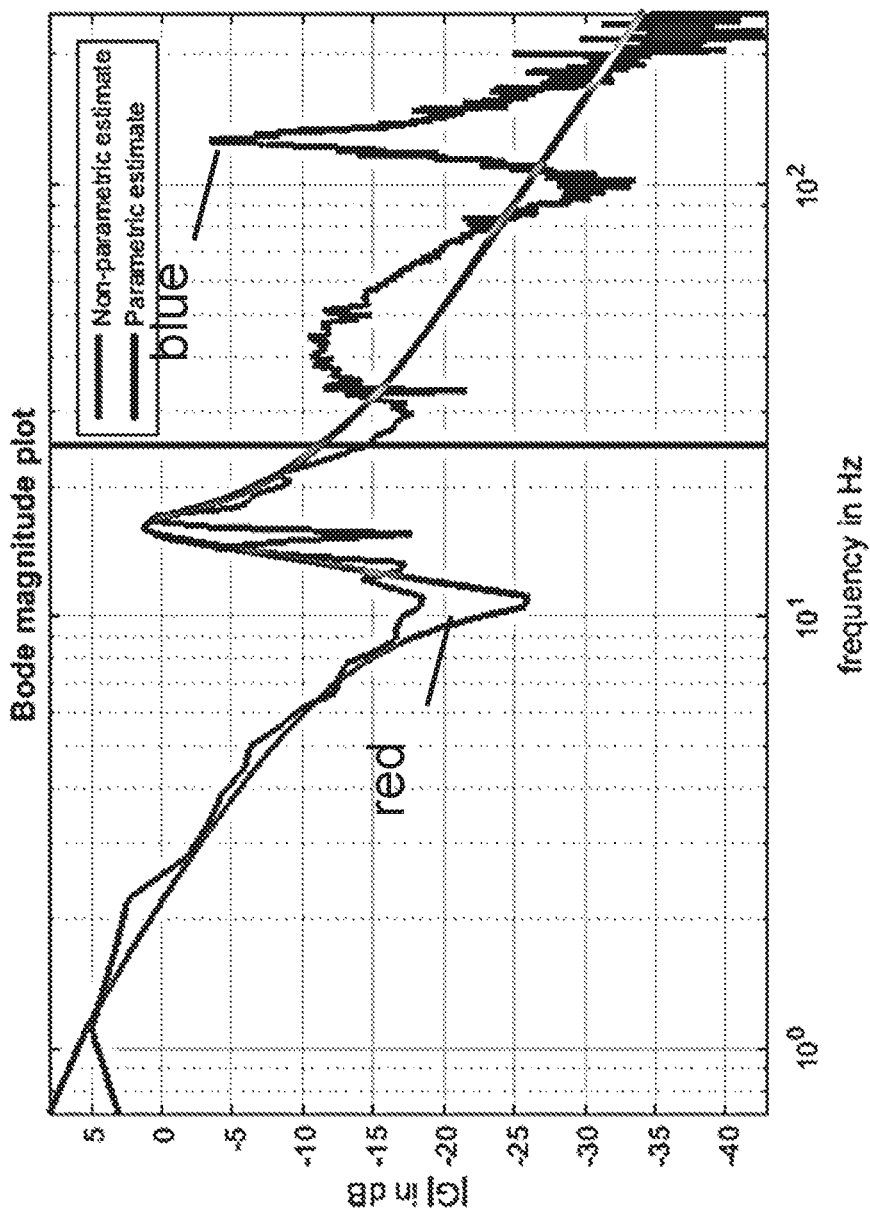
FIG. 3 shows approximation of non-parametric frequency response estimate by a two-mass model. Curve fitting is constrained by the right of the black line.
Figure 3C:
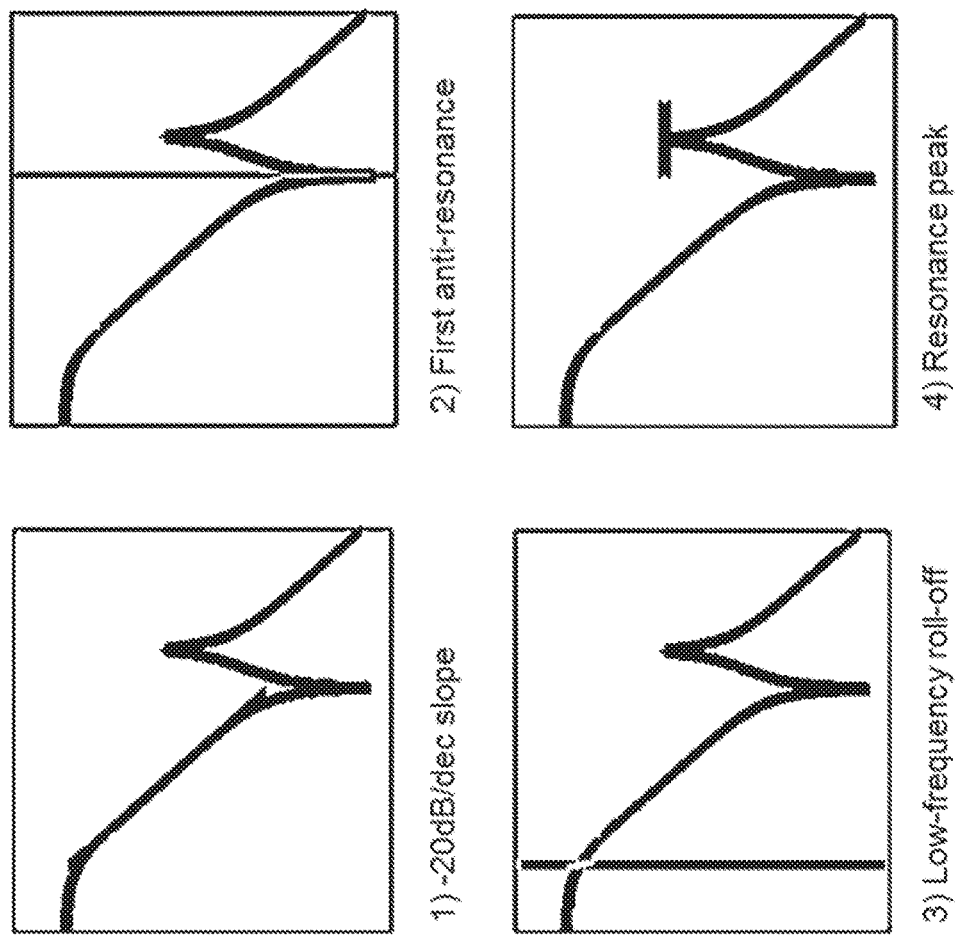
Figure 3C:
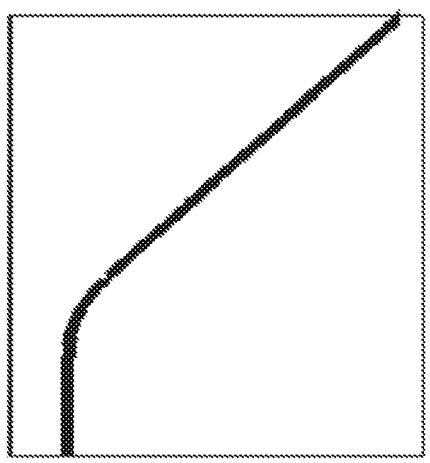
Figure 3C:
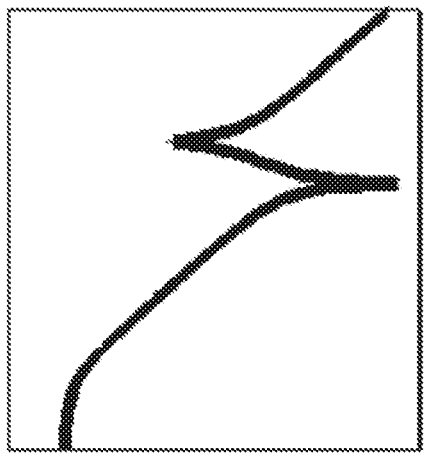
Figure 8C:
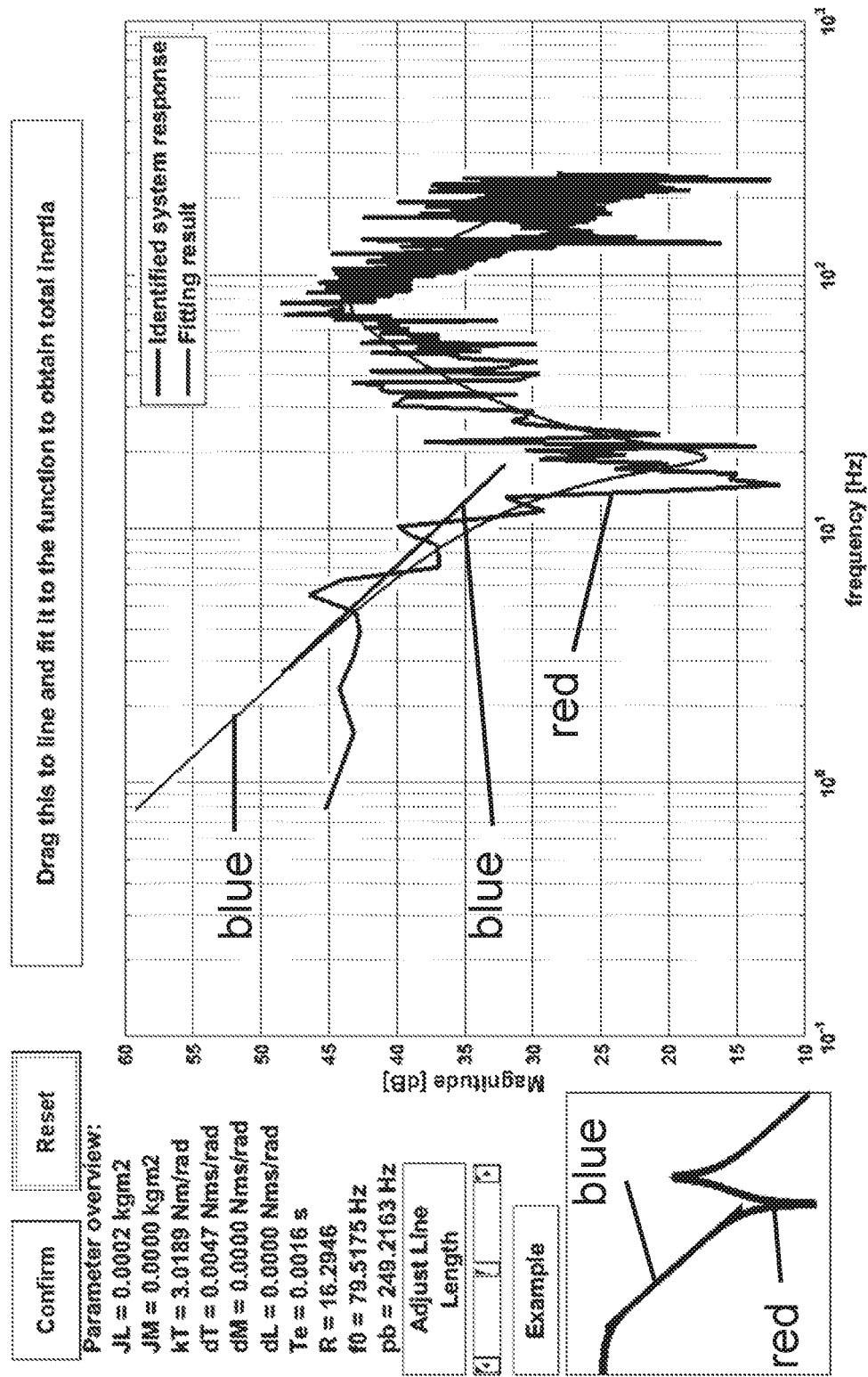
FIG. 8c shows interactive modification of step 1 for fine-tuning.

FIG. 3c represents the characteristic positions that are suggested to the user in order to find the blue curve in FIG. 8c. The red curve is indicated from the outset. The aim is to determine the blue curve by finding and marking characteristic positions, i.e. in the best possible match with the red one.

The physical parameters of the reference model are calculated and output from the characteristic positions.

By reference to the output physical parameters the frequency response of the reference model is graphically superimposed with the calculated frequency response.

The "blue slope" in FIG. 8c is changed for example with the mouse of a computer. The entire blue curve in FIG. 8c is thus changed. Fine tuning of the physical parameters is thus possible.

FIG. 3ca shows diagrammatically in the left-hand representation a flexible coupling. This relates to the case where a load is coupled to the motor via a flexible shaft ($k_T$, $d_T$) and a resonance magnification results in the frequency response.

A rigid coupling is shown in the right-hand representation. The latter results when the shaft is very rigid and $J_M$ and $J_L$ can be combined to form a total inertia. This pictogram is to be selected by the user when no resonance can be seen in the red curve.

In a first step, a non-parametric estimate is obtained from motor torque and motor speed measurements during an experiment in which a broad-band noise signal is injected on the torque level to excite the plant for identification.

For controller tuning, a parametric model is needed that is parameterized by physical parameters of a compliant two-mass system (such as motor inertia, load inertia, torsional stiffness, torsional damping, etc.).

The non-parametric estimate is represented by a Bode magnitude plot. This is the result of measurement data and hence subject to noise.

Furthermore, it can show more than one prominent resonance peak depending on the load mechanics. Hence, fitting a parametric model of a two-mass system to the calculated non-parametric Bode plot is a non-trivial task.

This invention disclosure proposes to solve this problem based on the observation that the general shape of the Bode plot for a two-mass system is described by a small number of characteristic features as marked in FIG. 3c.

These are namely
1) A −20 dB/dec slope prior to the first anti-resonance
2) The frequency of the first anti-resonance
3) A roll-off of the −20 dB/dec slope at low frequencies
4) The frequency and peak magnitude of the first resonance The second key idea of the invention disclosure is that the features listed above can easily be detected by a human. Consequently, the feature is realized as an interactive graphical user interface. It guides the user through the process by asking him/her to mark the curve features 1)-4) in the graphical representation of the non-parametric plant model (i.e. the Bode magnitude plot). In each step, a pictogram is shown to graphically indicate where the corresponding feature is to be placed as depicted in FIG. 4c to FIG. 7c.

After completing the steps 1)-4), each choice can interactively be modified to improve the quality of the curve fit of the identified parametric model to the non-parametric model.

FIG. 8c shows a situation in which the user can drag the −20 dB line in order to modify step 1.

This live interaction is made possible by reducing the underlying curve fitting problem to a simplified model that allows fast calculations.

The resulting physical parameters are shown and updated live, hence it is immediately visible how the change of 1)-4) affects the parameters of the parametric model.

This allows the user to modify the identified features interactively and observe how the resulting curve fit improves.

The mathematical background is that the features described above can be used to calculate approximate values for the physical parameters in the mechanical transfer function in a sequential manner (s. page 160 in [Ic]).

1. The −20 dB/dec slope of step 1 allows to calculate the total inertia $J_{tot}=J_M+J_L$.
2. The anti-resonance frequency (step 2) and the resonance frequency (step 4) allow to calculate the inertia ratio $J_L/J_M$ and thus, together with $J_{tot}$, the individual inertia $J_M$ and $J_L$ can be calculated. Knowing the individual inertia $J_M$ and $J_L$ and the anti-resonance (or resonance) frequency, the torsional stiffness $k_T$ can be calculated.
3. The low-frequency roll-off (step 3) allows to calculate the total viscous damping $d_{tot}=d_M+d_L$, given the total inertia $J_{tot}$. The user can specify how the damping is distributed between motor and load side (default choice: 1:1).
4. Knowing the individual inertia $J_M$ and $J_L$ and the torsional stiffness $k_T$, the torsional damping $d_T$ can be calculated from the resonance peak magnitude (step 4).

The disclosure also contains the contents of the following papers:

"Combining usability and performance—what smart actuators can learn from automatic commissioning of variable speed drives" (Proceedings Actuator 2016, ISBN 978-3-93333-26-3)

Abstract: The required steps for an automatic commissioning system for variable speed drives are summarized and an overview of existing approaches to the individual steps is provided. Furthermore, new results are presented on automatic design of plant identification experiments and the simultaneous parameterization of all relevant filters in the control loop based on the quality of available measurement signals. This results in a complete toolchain for commissioning speed control loops and allows to get the best possible performance out of the available hardware without requiring expert knowledge. It is discussed which steps will be necessary to establish a similar combination of performance and usability for smart actuators such as e.g. SMA or EAP.

Introduction: Variable speed drives (VSDs) are state-of-the-art in modern automation applications due to their energy efficiency and flexibility. Typical tasks include tracking of speed set-points and maintaining desired speed despite external disturbances. This is why drives are operated under closed-loop feedback as shown in FIG. 1.

Productivity is key in such applications and can directly be related to the tuning of the parameters of the feedback-loop. As a consequence, poorly tuned parameters may have negative effects, ranging from degraded performance to instability and mechanical damage. But tuning requires expert know-how, from both a controls and application perspective. This is the major reason why the majority of VSDs are operated with very defensive default parameters in practice, resulting in poor overall performance of the application.

In order to change this situation and lift the full potential of VSDs in such applications, this paper presents methods for automatic parameterization of the control loops during the commissioning phase. While this in itself is not new, this paper focuses on incorporating two disregarded aspects:

i) In order to develop a truly automatic commissioning system, the experiments for gathering measurement data for plant identification have to be carefully designed. Particularly, identification experiments without operator input are needed.

ii) The quality of the speed signal available for feedback plays a crucial role for the achievable control performance, since any measurement implies the introduction of noise into the control loop as depicted in FIG. 1.

While it is intuitive that a clean signal obtained from a high-quality encoder allows for higher control performance, compared to the noisy speed signal measured by a low-cost device, an automatic commissioning system has to take into account the quality of the speed measurement.

To this end, not only the speed PI controller but also additional filters in the control loop have to be considered simultaneously.

Many of these consequences should be carefully taken into account when designing controllers for systems containing smart actuators as well. Thus, the latter can still learn a lot from classical drives.

The remainder of the paper is organized as follows: In the next Section we will present the basic models used inside drive commissioning and introduce the plant identification experiment performed together with the plant identification itself. After that the fundamentals of the combined controller/filter tuning are explained before we highlight the major learning possibilities for smart actuators. Lastly, a conclusion is provided.

Automatic speed control commissioning in variable speed drives:

As an example for automatic commissioning, we consider the parameterization of the speed control loop of variable speed drives connected to a mechanical load. The control loop with its relevant dynamic elements is sketched in FIG. 1.

We focus on mechanical plants which can be described by two compliantly coupled inertia. The dynamics of the mechanical part can be described by the transfer function $$G_m(s) = \frac{J_L s^2 + d_T s + k_T}{J_M J_L s^3 + d_T J_{tot} s^2 + k_T J_{tot} s}, \quad (1)$$

where $J_M$ is motor side inertia, $J_L$ is load side inertia, $J_{tot} = J_M + J_L$ is the total inertia, and $k_T$ and $d_T$ describe the stiffness and damping of the compliant coupling, respectively. We omit motor and load side damping in this paper for the sake of brevity and clarity of presentation but the presented methods can readily be extended to take such effects into account. While the torque control of modern drives is typically non-linear [1], the closed-loop behaviour of the torque control block can be approximated by simplified linear models for the purpose of speed controller design. Common approximations are second-order lag elements with time delay [3] or first-order lag elements. In this overview, we rely on the latter, i.e.

$$G_{TC}(s) = \frac{1}{T_e s + 1}, \quad (2)$$

where the electrical time constant $T_e$ characterizes the dynamics of the torque control loop and is assumed to be known from torque control performance specifications.

The structure of the speed controller and the speed feedback filter are fixed in standard drives, where most commonly PI controllers and first-order low-pass feedback filters are in use. The corresponding transfer functions are $$G_{PI}(s) = K_P + \frac{K_I}{s}, \quad (3)$$

$$G_f(s) = \frac{1}{T_f s + 1}. \quad (4)$$

The challenge in commissioning is to find suitable parameters $K_P$, $K_I$, and $T_f$ that result in sufficient speed control performance. While "performance" is most commonly perceived as high control bandwidth, smoothness of the control signal (torque reference) is another important tuning objective.

Designing the plant identification experiment:

In a first step, the total mechanical inertia $J_{tot}$ is to be roughly estimated. A common approach is to apply torque ramps and infer total inertia from measured torque $T_M$ and speed $\omega_{act}$. Since torque ramps hardly excite the high-frequency dynamics of the mechanics, compliance of the coupling can be neglected resulting in the simplified transfer function $$\tilde{G}_m(s) = \lim_{k_T \to \infty} G_m(s) = \frac{1}{J_{tot} s}. \quad (5)$$

Thus, $J_{tot} \dot{\omega}_{act} \approx T_M$ and $J_{tot}$ can be estimated e.g. from integrating speed (once) and torque (twice) or by applying recursive least-squares techniques in time domain [3].

For estimating the remaining mechanical parameters, higher frequency ranges have to be excited. As depicted in FIG. 1, an excitation signal is injected on torque reference level. Alternatively, the excitation signal can also be specified on speed level [4]. For identifying mechanical loads in drive systems, e.g. sine sweeps, chirp signals and pseudo-random binary signals (PRBS) can be used (see e.g. [15], [16] for an overview on plant identification signals). Here, we rely on PRBS signals due to their guaranteed amplitude limits and comparatively easy parameterization. With the basic signal type chosen, it remains to parameterize the identification signal. The basic reasoning is that the plant should on the one hand be excited as much as possible to maximize the signal-to-noise ratio in the signals recorded for identification. On the other hand, excitation should be as less as possible in order to minimize the mechanical stress for the plant. While this general idea is intuitive, it typically requires experience to properly choose the signal parameters.

The PRBS signal is characterized by two key properties: The signal amplitude $a_{PRBS}$ and the cycle time $\lambda_{PRBS}$. According to [1], [15], the power spectral density (PSD) of the PRBS signal can be considered to be constant up to a frequency of $$f_{3dB} = \frac{1}{3\lambda_{PRBS}}, \quad (6)$$

with a PSD magnitude of $$S_{dd}(\omega) = a_{PRBS}^2 \lambda_{PRBS}. \quad (7)$$

Analyzing (7), an increased amplitude directly raises the PSD and thus improves signal-to-noise ratio. Furthermore, an increased cycle time results in larger values of the PRBS PSD at low frequencies but limits the frequency range of excitation according to (6), (7). In [1], the influence of PRBS parameters on the resulting identification quality was studied experimentally. Here, we propose to predict the quality of identification results based on PRBS signal properties and the quality of the available speed feedback signal. The identification quality can be quantified by specifying a tolerated variance γ in the resulting frequency response, i.e. the non-parametric Bode magnitude plot estimate.

Assuming a constant noise level $\bar{S}_{nn}$ in the measurement signal and exploiting the PSD properties (6), (7) of a PRBS signal, the required amplitude of the PRBS signal to achieve the desired identification quality can be derived as $$a_{PRBS} = \frac{2\pi}{\gamma} J_{tot} f_{3dB}^{\frac{3}{2}} \sqrt{3 \bar{S}_{nn}}. \tag{8}$$

Therein, $J_{tot}$ is the total system inertia and $f_{3\,dB}$ is the frequency up to which the plant is to be excited for identification. While it is evident that larger excitation amplitudes are required for systems with higher inertia, analyzing (8) also reveals that identifying dynamics at high frequencies comes at the price of overproportionally large excitation amplitudes.

Depending on the amplitude that can be tolerated by the mechanics attached, the identifiable frequency range is thus limited.

To benefit from (8) in the sense of automatic parameterization of the identification experiment, the noise level in the speed measurement $\bar{S}_{nn}$ has to be known. Ideally, this would be obtained by running the system in torque control mode (i.e. open-loop control with respect to speed) and estimating the PSD $S_{nn}(\omega)$ of the speed signal e.g. by applying the Welch method [15], [16]. However, in practice it is paramount in a lot of applications to maintain a constant speed and the estimation of feedback signal quality has to be conducted in closed-loop. To mitigate this, a very defensive speed PI controller can be employed for the identification experiments. Therewith, the complicating effects of closed-loop identification [15], [16] can be neglected and the PSD of measurement noise can be approximated by the PSD of measured speed after removing signal mean.

Hence, $\bar{S}_{nn}$ can be inferred from averaging $\bar{S}_{yy}(\omega)$, i.e. an estimate of the measured speed PSD after removing signal mean.

Plant Identification:

From the plant identification experiment described in the previous section, the PRBS, torque, and speed signal are available as measurements. In the next step, the objective is to identify the parameters of the mechanical part of the plant. Both time-domain approaches [5], [6] and frequency-domain methods [3], [4], [12], [17] have been reported for solving this task.

For the latter, a first step is to obtain a non-parametric estimate of the frequency response. In case of open-loop identification, a conceptually simple approach is to infer an estimate $\hat{G}_m(j\omega_i)$ by dividing the Discrete Fourier Transform (DFT) of speed by the DFT of torque as e.g. reported in [11]. To mitigate leakage effects and for obtaining smoothed and consistent estimates, the Welch method can be employed to calculate estimates of (cross-) power spectral densities [3], [4]. Denote with $\hat{S}_{yu}(\omega)$ the cross PSD of speed and torque and with the $\hat{S}_{uu}(\omega)$ power spectral density of torque, the frequency response can be estimated by $$\hat{G}_m(j\omega) = \frac{\hat{S}_{yu}(\omega)}{\hat{S}_{uu}(\omega)}. \tag{9}$$

However, (9) implicitly assumes open-loop identification. As discussed before, we study the practically relevant case of closed-loop identification here. In such a situation, it is beneficial to base the frequency response estimation on three signals according to $$\hat{G}_m(j\omega) = \frac{\hat{S}_{dy}(\omega)}{\hat{S}_{du}(\omega)}, \tag{10}$$

where d is the PRBS signal, u is the torque reference and γ is measured speed. This will improve the overall quality of the non-parametric estimates.

Since the structure of the mechanical system at hand is known, it is possible to identify the physical parameters of the mechanics based on the non-parametric estimate of the frequency response. This can be formalized into solving the optimization problem $$\min_{J_M, J_L, k_T, d_T} \sum_{i=1}^{N} \kappa_i |G_{m,i}(j\omega_i) - \hat{G}_{m,i}(j\omega_i)|^2. \tag{11}$$

Therein, $G_{m,i}(j\omega_i)$ is the transfer function of the two-mass model (1) evaluated at the frequency $\omega_i$ and $\hat{G}_{m,i}(j\omega_i)$ is the corresponding non-parametric estimate. The factor $\kappa_i$ can be employed to weight the error terms in the cost function. As pointed out in [3], [4] the problem (11) is non-convex and hence non-trivial to solve. In addition to that, a standard least-squares curve fit may not lead to satisfying results due to two main reasons: Firstly, the non-parametric Bode plot is deteriorated especially at anti-resonance frequencies [3]. To tackle this problem, we propose to employ the coherence function relating the PRBS signal and the speed signal for weighting the errors in (11) similar to the results presented in [14]. Intuitively speaking, the coherence function quantifies to what extent an output can be explained by a given input and a linear system connecting the two [3]. From the estimates of (cross-) spectral densities, the coherence of two signals u and γ can be calculated from $$\gamma^2(\omega) = \frac{|S_{yu}(\omega)|^2}{S_{uu}(\omega) S_{yy}(\omega)}. \tag{12}$$

The proposed coherence weighting $\kappa_i = \gamma^2(\omega_i)$ ensures that frequency ranges in which the non-parametric frequency response estimate is unreliable are less significantly taken into account for the identification of physical parameters in the curve fit.

FIG. 2 shows an example of a coherence function estimate next to the corresponding calculated measured frequency response.

Secondly, unmodeled effects may affect curve fitting results negatively. As an example consider the non-parametric estimate in FIG. 3 (blue). Apparently, more than one resonance is present. One option would be to extend the model structure to three- or multiple-mass systems [3], [4]. This comes at the cost of increased computational load for solving the curve fitting. However, for a lot of applications it is sufficient to only model the first resonance of the system. Consequently, only frequencies up to an upper bound $f_{max}$ are taken into account in the curve fitting process. The frequency $f_{max}$ can easily identified by human inspection of the frequency response estimate. To automatically determine $f_{max}$, peak-detection algorithms [21] can be applied to a smoothed version of the frequency response estimate. Having determined the anti-resonance ($f_a$) and resonance ($f_0$) frequency, the upper bound can be estimated by mirroring $f_a$ with respect to $f_0$ in logarithmic scaling, i.e.

$$f_{max} = \frac{f_0^2}{f_a}. \tag{13}$$

FIG. 3 also shows an example of a curve fit (red) obtained by constraining the frequency range for fitting and employing coherence weighting.

Simultaneous Controller and Filter Tuning:

Assuming a model of the mechanical plant as well as the dynamics of the underlying closed-loop torque control, several results have been reported on tuning the parameters of the PI speed controller. In systems with stiff load coupling, frequently used approaches are the tuning based on the symmetric and amplitude optimum [13], [18], [20]. For mechanical systems with compliant load coupling, tuning rules for PI controllers are provided in [7] and [8]. An optimization-based approach solely relying on non-parametric plant models is presented in [11].

Furthermore, structural controller extensions such as additional feedbacks [9], model-predictive control [10], and Fuzzy-PI [17] have been reported. However, such advanced control structures are often not available in industrial drives and furthermore come with the drawback of increasing tuning complexity. In addition to that, the approaches mentioned above take into account the dynamics of compliant load coupling, but neglect the dynamics of the torque control loop. Even the single additional pole introduced by the simplified first-order approximation (2) can cause a severe loss of phase margin and might even result in instability. We emphasize that it is therefore mandatory to take all relevant dynamic elements in the speed control loop into account as also proposed in [19]. This also involves the speed feedback filter (4), typically being a first-order low-pass.

Traditionally, the speed PI controller is regarded as the key element to achieving good speed control performance. The feedback filter has been receiving a lot less attention, since a common assumption is that the filtering should be as light as possible.

In the following, we show that heavier feedback filtering does in fact not necessarily result in degraded performance. The reason for this is that tuning the speed loop in real-world systems always has to take into account the quality of the available speed measurement. While this statement might seem trivial at first sight, its implications are substantial. If the speed measurement is e.g. heavily corrupted by noise, only very small controller gains can be realized in order not to amplify noise too much. In such a situation, heavier feedback filtering can in fact allow for higher controller gains while keeping the ripple in the torque signal below specified limits.

Since the speed PI controller and the feedback filter are part of the same control loop, it is not advisable to tune them separately. Changing the feedback filter after parameterizing the speed PI controller will deteriorate performance and can even result in instability.

Formalizing the idea introduced above, we propose to simultaneously tune the speed PI and the feedback filter. The general reasoning that is not limited to speed loop tuning is to take all relevant dynamic elements in a control loop into account and to tune all adjustable parameters in a control loop simultaneously.

A frequently used tuning objective is to maximize speed loop performance (i.e. bandwidth). However, several constraints limiting the achievable performance are to be considered. We formulate this idea as an optimization problem and subsequently explain the constraints below.

$$\max_{K_P, K_I, T_f} \min_{i=1,\dots,6} |\lambda_i|, \text{ subject to}$$

$$\arctan\left(-\frac{\text{Im}(\lambda_i)}{\text{Re}(\lambda_i)}\right) < \alpha, \forall\, i = 1, \dots, 6, \tag{14}$$

$$\text{Re}(\lambda_i) > \beta, \forall\, i = 1, \dots, 6,$$

$$\sqrt{\hat{S}_{uu}} < \delta, \hat{S}_{uu}(\omega) = |G_{un}(\omega)|^2 \cdot \overline{S}_{nn}$$

In (14), are the closed-loop poles, i.e. the roots of the denominator in $$G_{cl}(s) = \frac{G_f(s)G_{PI}(s)G_{TC}(s)G_m(s)}{1 + G_f(s)G_{PI}(s)G_{TC}(s)G_m(s)}. \tag{15}$$

Figure 4:
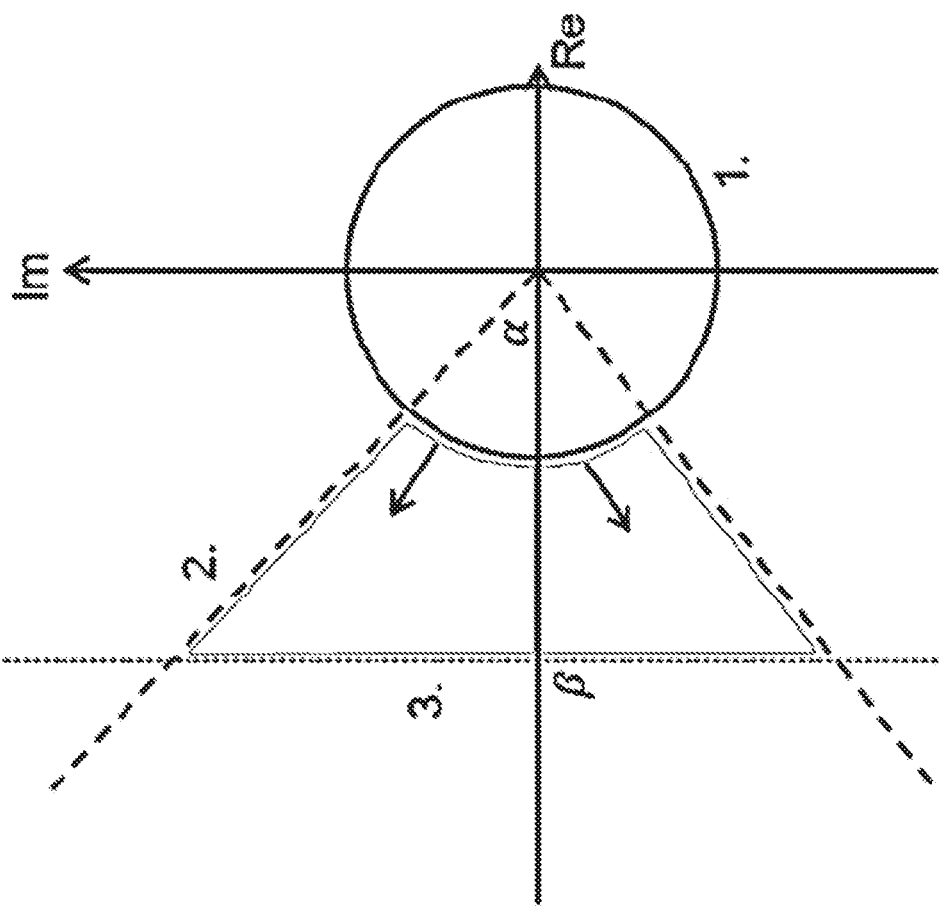
FIG. 4 shows constraints for closed-loop eigenvalues in optimization-based controller and filter tuning.
Figure 4C:
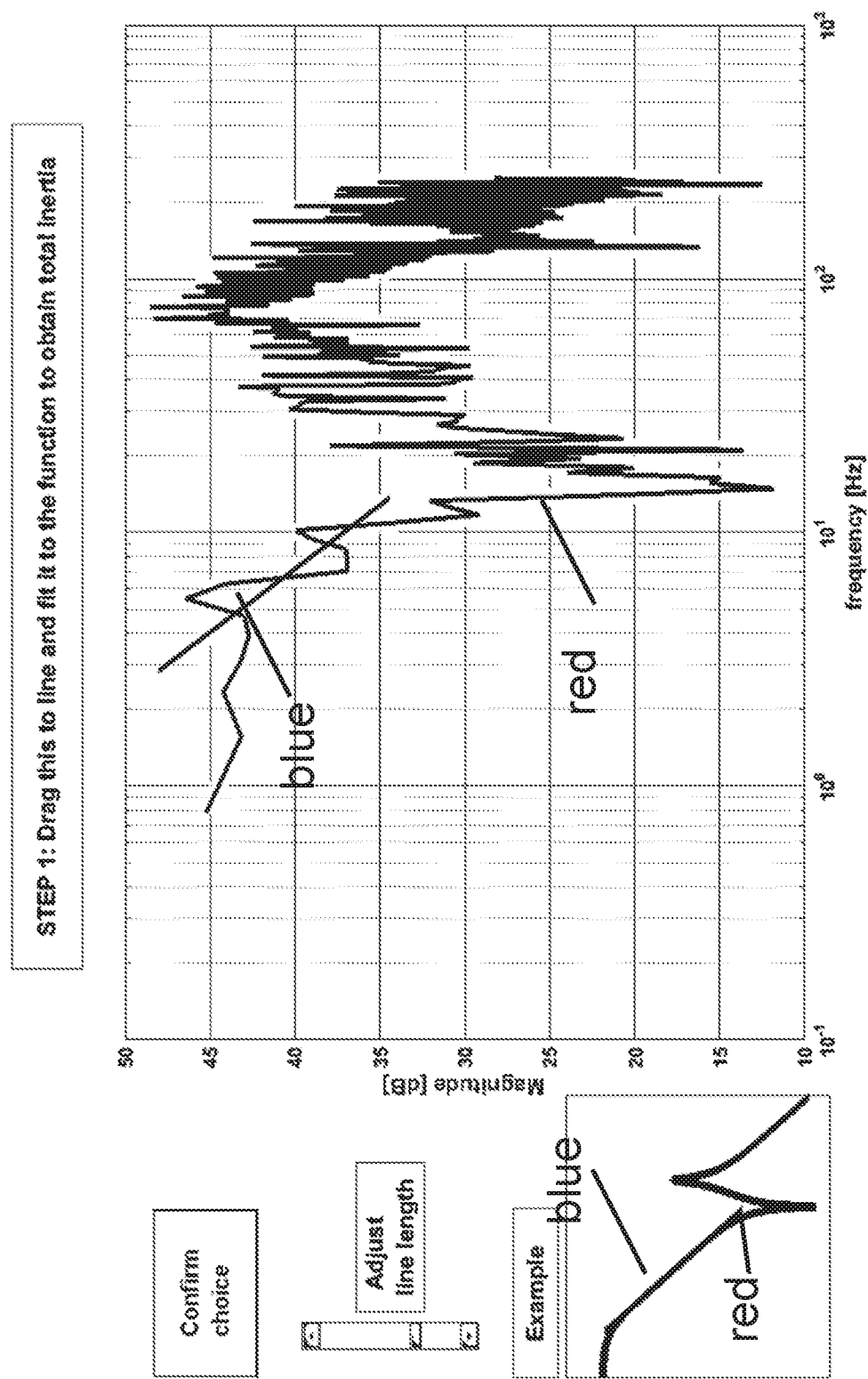
FIG. 4c shows first feature to be identified by the user: −20 dB line prior to first anti-resonance (blue line placed on top of the blue curve). The pictogram in the lower-left corner presents an idealized situation and is intended to facilitate usage of the method for non-experts.

As depicted in FIG. 4, the objective is to maximize the minimum absolute values of all closed-loop eigenvalues, which corresponds to the bandwidth of the control loop. The first constraint bounds the angle of closed-loop poles in the complex plane, thereby ensuring stability and preventing excessive oscillations. The second constraint limits the aggressiveness of the controller and thereby prevents excitation of higher order resonances (cf. $f_{max}$ in (13)). Lastly, the tolerated noise level in the control signal, i.e. the commanded torque reference, is bounded. Therein, the torque PSD $\hat{S}_{uu}(\omega)$ is estimated based on the identified noise level in the speed measurement ($\overline{S}_{nn}$) and the transfer function $G_{un}(\omega)$ linking measurement noise to the control signal.

We point out that the benefit of the last constraint in (14) is twofold: Firstly, the torque noise bound $\delta$ provides an intuitive means for trading-off smoothness of the control signal and speed control performance. The larger $\delta$ is chosen, the more torque ripple is tolerated and the higher the achievable performance will be. Secondly, the quality of the available feedback signal is quantified by $\overline{S}_{nn}$ and thus explicitly taken into account for controller and feedback filter tuning.

Figure 5:
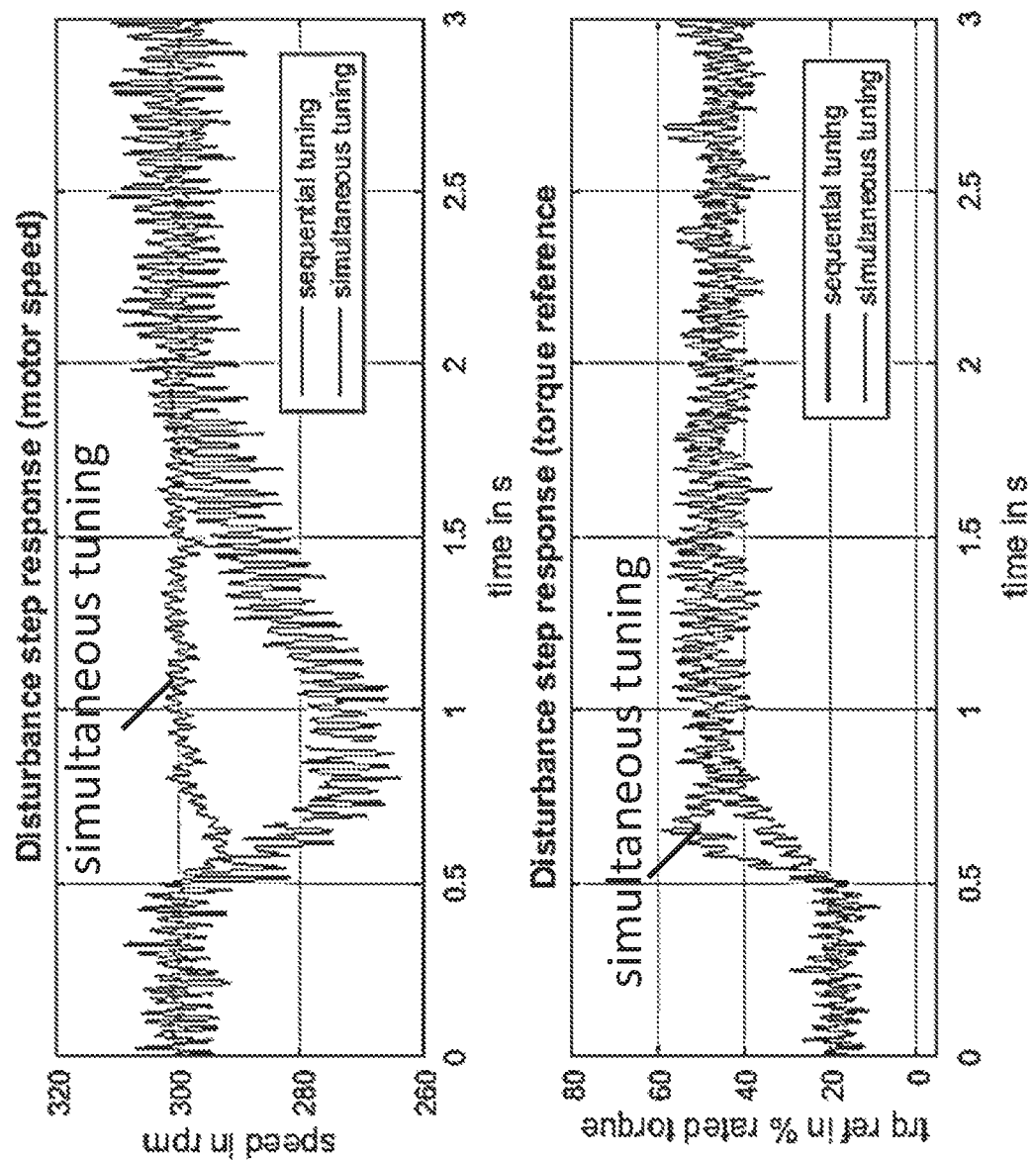
FIG. 5 shows performance improvement achieved by simultaneously tuning controller and feedback filter parameters.
Figure 5C:
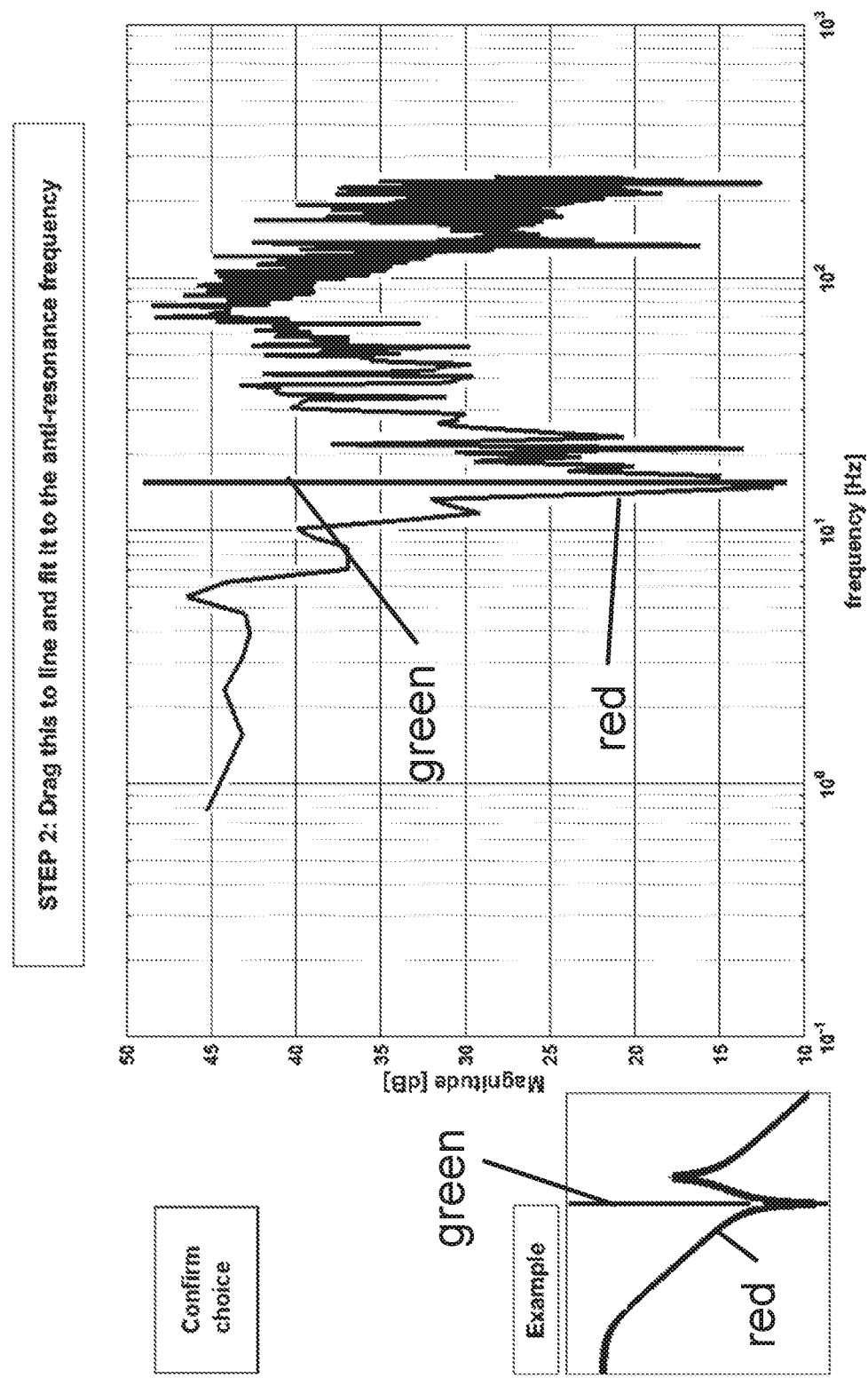
FIG. 5c shows a second feature to be identified by the user: First anti-resonance frequency (vertical green line). Similar to step 1, the pictogram tells the user what to do.
Figure 6C:
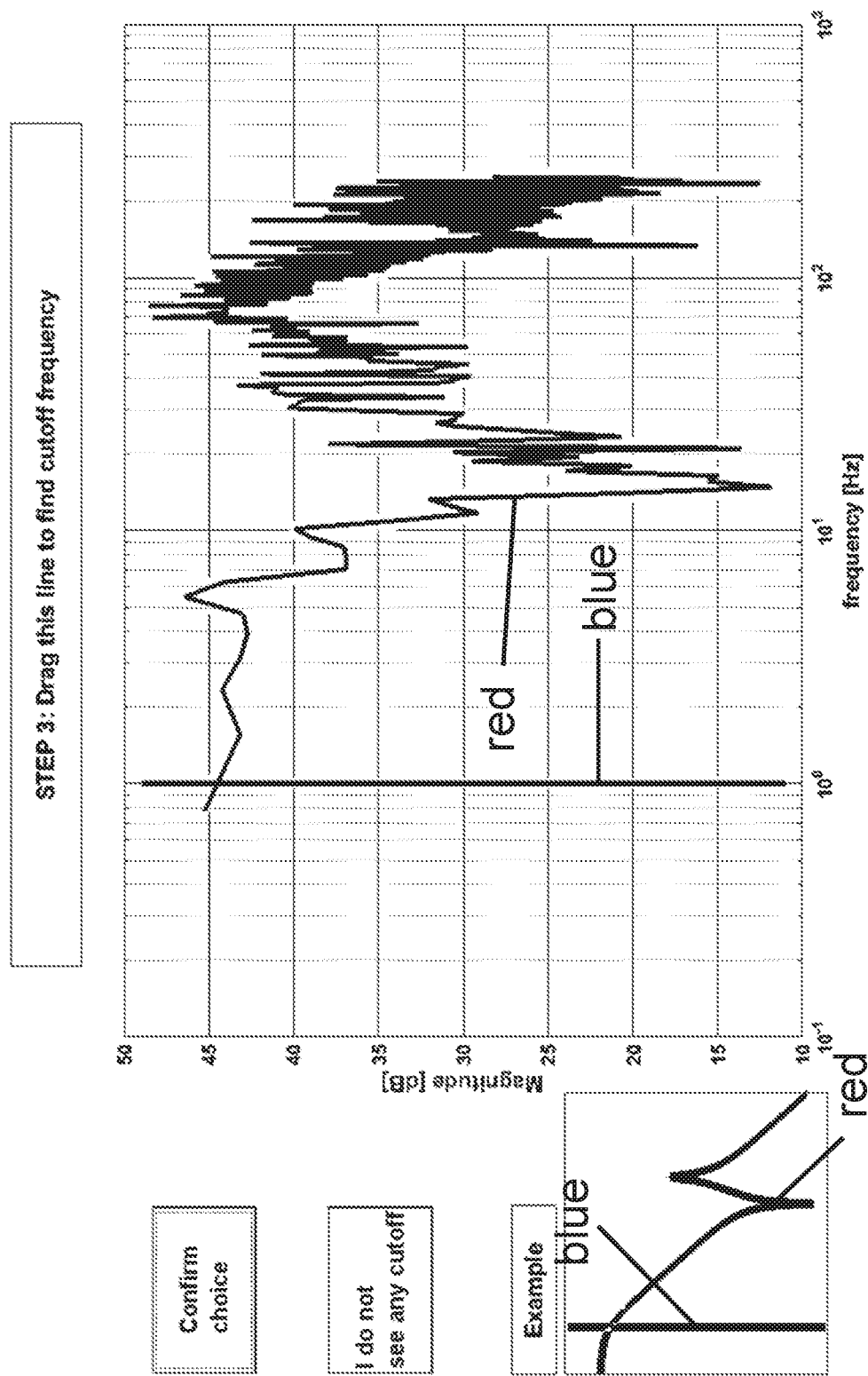
FIG. 6c shows third feature to be identified by the user: Low-frequency roll-off frequency (vertical light blue line) with the pictogram in the lower-left corner for help.
Figure 7C:
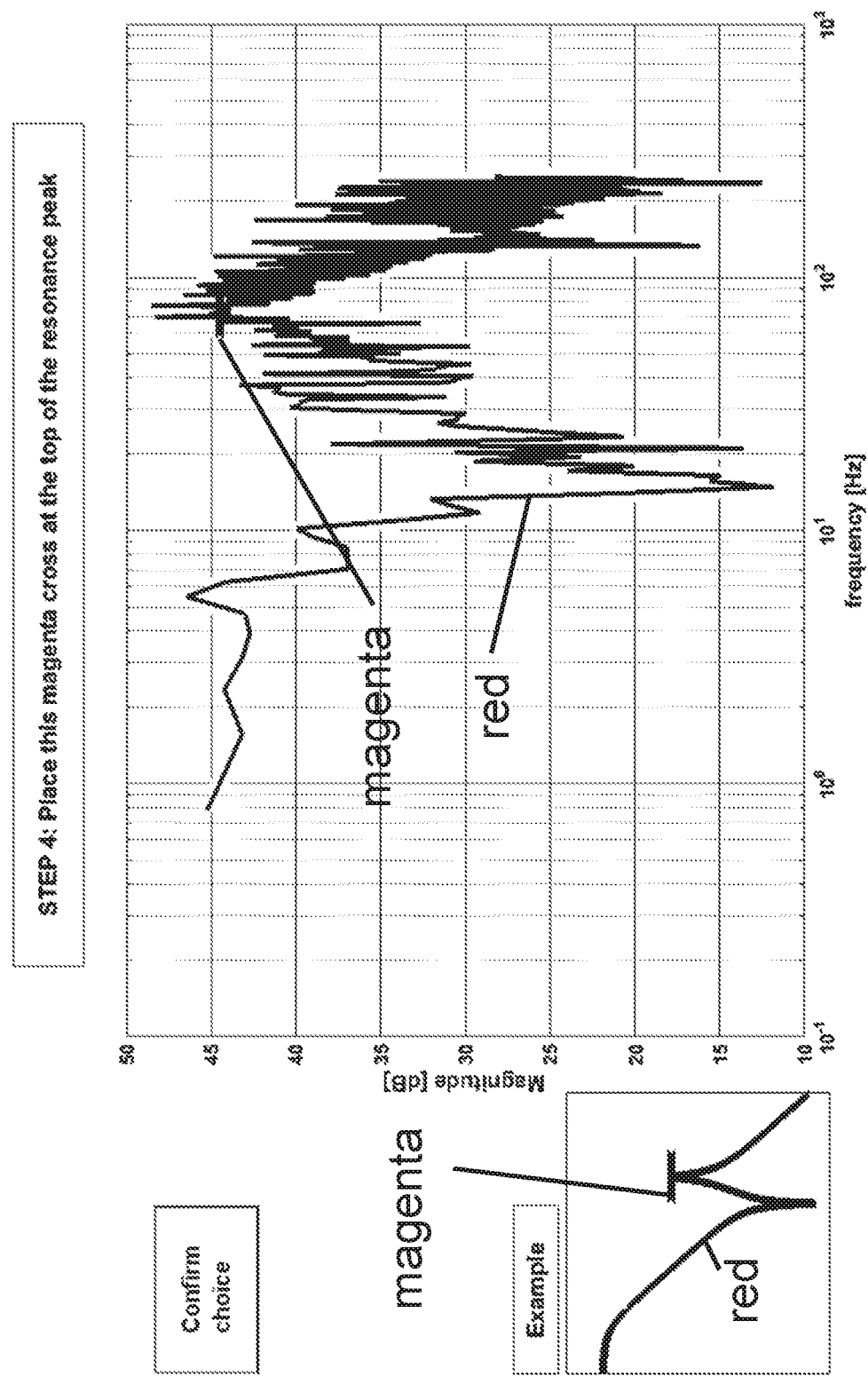
FIG. 7c shows fourth feature to be identified by the user: Resonance peak (magenta cross). The pictogram again provides assistance regarding what to do.

FIG. 5 shows an exemplary result, comparing the resulting speed control performance of a standard approach (tuning speed PI parameters for a fixed feedback filter time) and the proposed simultaneous tuning of speed PI and feedback filter. Both controllers have been tuned to result in the same noise level in the control signal (cf. lower plot in FIG. 5). The simultaneous tuning approach results in a much larger speed feedback filter time. As a consequence, more aggressive PI gains are possible, resulting in substantially improved control performance at the same level of torque ripple.

What smart Actuators can learn from successful auto-tuning of variable speed drives:

Modelling the structure of the individual elements in the control loop is a necessary first step in developing automatic commissioning systems. Such models will be of more complex nature in smart actuators compared to the presented VSDs here. Since most often descriptions based on PDEs are employed, model-reduction techniques are needed to define an appropriate model for control design. In a second step, identification experiments have to be designed to provide sufficient excitation allowing for reliable identification. This step is devoted to estimating the parameters of the plant. As we showed, estimating the quality of the available feedback signal is another vital part of plant identification. Once parametric models of the plant are available, the parameters of the feedback loop can be tuned.

It is advisable to employ three signals for obtaining a non-parametric estimate of the frequency response. Furthermore, coherence weighting is an efficient method to improve parametric estimates obtained by fitting a mechanical model onto the estimated frequency response. This can still be a valuable method even if more complex actuator models are investigated. A third important aspect is to constrain the curve fitting to frequency ranges that are valid for the chosen model structure—strongly depending on the model reduction performed. Lastly, we emphasize that the achievable identification quality is naturally limited by the amount of samples available for identification.

Finally, key to achieving a high control-loop performance is to simultaneously tune all parameters in a feedback loop, instead of sequential tuning. Furthermore, the quality of the feedback signal is to be taken into account, since it is one of the main factors determining the achievable performance.

We point out that optimization-based tuning approaches provide an effective way of combining performance and usability if a mapping of intuitive performance criteria to constraints in the optimization problem can be established. Due to ever increasing computational power, the additional computational load, compared to simple tuning rules such as the symmetric optimum rule, is less and less relevant.

CONCLUSION

In this paper we showed key ingredients for automatic commissioning of VSDs. Starting from appropriate grey-box models to the parameter identification and finally to the combined tuning of the relevant feedback-loop parameters.

All of the above will also be necessary in smart actuator systems to achieve high closed-loop performance even though the complexity of the models and interdependencies of the different steps will be much higher.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

1 first control signal
2 mechanical device
3 control circuit
4 return signal
4' second return signal
5 excitation signal
6 second control signal
7 actual angular velocity
8 torque control
9 speed controller
10 velocity filter

What is claimed is:

1. A method to identify physical parameters of a mechanical load, comprising:
   applying a first control signal to a mechanical device in a control circuit;
   measuring a first return signal;
   determining a power density spectrum of the first return signal, the power density spectrum comprising a measure of variance from a given frequency band in a Fourier representation; and
   using the power density spectrum of the first return signal to stipulate an excitation signal for the mechanical device.

2. The method according to claim 1, wherein the excitation signal comprises a pseudo-random binary signal is used as the excitation signal.

3. The method according to claim 1, further comprising:
   applying a second control signal to the control circuit, the second control signal comprising the first control signal and the excitation signal;
   calculating power density spectra of the second control signal and the second return signal; and
   calculating a frequency response of the mechanical device from the power density spectra.

4. The method according to claim 1, further comprising:
   selecting, by a user, a reference model for the mechanical device.

5. The method according to claim 4, wherein the selecting comprises references to a graphical representation of a frequency response of a respective reference model, and
   wherein the respective reference model is describable by physical parameters.

6. The method according to claim 5, further comprising:
   determining or marking, by the user, characteristic positions in the frequency response of the selected reference model in a calculated frequency response.

7. The method according to claim 6, further comprising:
   calculating and outputting the physical parameters of the reference model from the characteristic positions.

8. The method according to claim 7, further comprising:
graphically superimposing the frequency response of the reference model with the calculated frequency response by reference to output physical parameters.

9. The method according to claim 1, wherein the excitation signal comprises a broad-band excitation signal.

* * * * *